United States Patent [19]

Tennant et al.

[11] Patent Number: 4,901,186

[45] Date of Patent: Feb. 13, 1990

[54] TEMPERATURE COMPENSATED THERMAL PROTECTOR

[75] Inventors: James A. Tennant, Perrysville; Charles Yagher, Jr., Lexington, both of Ohio

[73] Assignee: Therm-O-Disc, Incorporated, Mansfield, Ohio

[21] Appl. No.: 202,945

[22] Filed: Jun. 6, 1988

[51] Int. Cl.⁴ .............................................. H01H 5/04
[52] U.S. Cl. .................................... 361/106; 338/22 R
[58] Field of Search ................... 261/103, 106; 338/20, 338/21, 22 K, 23, 24, 25

[56] References Cited

U.S. PATENT DOCUMENTS 3,644,864  2/1972  Hirsbrunner et al. ............... 361/106
3,916,264 10/1975  Berg .................................... 361/106

Primary Examiner—Derek S. Jennings
Attorney, Agent, or Firm—Jones, Day, Reavis & Pogue

[57] ABSTRACT

A protective PTC device is heated by another PTC device to an elevated temperature greater than ambient but less than its switching temperature. The elevated temperature of the protective PTC device reduces its switching response time, and minimizes variations in such response time with variations in ambient temperature.

3 Claims, 1 Drawing Sheet

TEMPERATURE COMPENSATED THERMAL PROTECTOR

BACKGROUND OF THE INVENTION

This application relates to the art of thermal protectors and, more particularly, to thermal protectors of the type used for protecting a load in an electric circuit. The invention is particularly applicable to thermal protectors of the type having a positive temperature coefficient of resistance, and will be described with specific reference thereto. However, it will be appreciated that the invention has broader aspects and may find uses with thermal protectors of other types.

SUMMARY OF THE INVENTION

A thermal protector is heated to an elevated temperature greater than ambient temperature but less than its switching temperature. In the event of a circuit malfunction, the time required for the thermal protector to reach its switching temperature is substantially reduced, because the starting point is the elevated temperature instead of ambient temperature. There is also minimal variation in operating time with variations in ambient temperature.

In a preferred arrangement, the thermal protector is one having a positive temperature coefficient of resistance, commonly known as a PTC device. Heat is supplied to the protective PTC device by a heater PTC device. The heater PTC device has a switching temperature that is greater than ambient temperature and less than the switching temperature of the protective PTC device. During normal operation of the circuit, the heater PTC device switches to its high resistance state and supplies heat to the protective PTC device.

The protective and heater PTC devices may be connected in parallel or in series and, when connected in series, the heater PTC device is in parallel with the load being protected.

The initial resistance of the heater PTC device is substantially greater than the initial resistance of the protective PTC device so that the heater PTC device reaches its switching temperature shortly after the circuit is energized.

It is a principal object of the present invention to provide a improved arrangement for reducing the response time of thermal protector.

It is also an object of the invention to provide an arrangement for minimizing the effect of varying ambient temperature conditions on the response time of a thermal protector.

It is a further object of the invention to provide an improved thermal protector assembly that includes a protective thermal protector and a heater for same.

DESCRIPTION OF PREFERRED EMBODIMENTS

Figure 1:
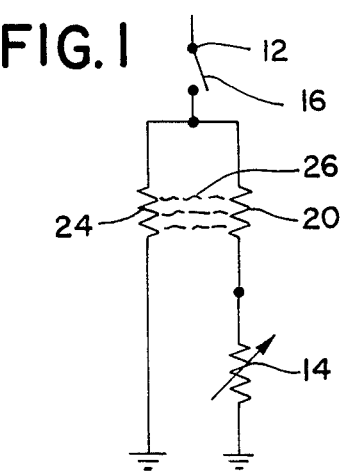
FIG. 1 shows a typical circuit having the improved thermal protector arrangement of the present application incorporated therein.

Referring now to the drawing, wherein the showings are for purposes of illustrating certain preferred embodiments of the invention only, and not for purposes of limiting same, FIG. 1 shows a voltage source 12 connected with a load 14 through a switch 16. Load 14 can take many forms, including an electric motor or an electric heater.

A thermal protector 20 is connected in series between voltage source 12 and load 14. In the event of a malfunction, thermal protector 20 interrupts effective current flow to load 14. In arrangements of this type, the response time of thermal protector 20 varies substantially with variations in ambient temperature. In accordance with the present application, the response time of thermal protector 20 is made substantially uniform, and substantially independent of variations in ambient temperature.

Thermal protector 20 is preferably of the type having a positive temperature coefficient of resistance. In addition, thermal protector 20 is preferably made of a material having a positive temperature coefficient of resistance. The material can be a conductive polymer having a particulate conductive filler, such as carbon black. However, the material can also take other forms, including a doped ceramic, such as barium titanate. For purposes of this application, a thermal protector of the type described will be referred to as a PTC device or a PTC material. A PTC device exhibits a non-linear change in resistance with temperature. Within a certain narrow temperature range, the electrical resistance of a PTC device jumps sharply. A PTC device may be customized to respond to either temperature conditions of the surrounding environment or to current overload conditions. Also, the resistance and switching temperature of a PTC device can be varied by changing the composition of the PTC material, and by changing its geometry.

In a typical application, a PTC device is connected in series with the circuit components requiring protection. In the event of an overload in the system, the PTC device will reach switching temperature either by self-induced heating ($I^2R$) from the current passing through it or by sensing excessive ambient temperatures. At this point, the PTC device switches into its high resistance state, and effectively blocks the flow of current. A minimal amount of current will persist (trickle current), which holds the PTC device in its high resistance state. Once the power source has been interrupted, and the abnormal condition corrected, the PTC device will return to its rated conductive state, ready to protect the system once again.

In accordance with the present application, a heater PTC device 24 is positioned in heat transfer relationship with protective PTC device 20. The switching temperature of heater PTC device 24 is greater than normal ambient temperature and less than the switching temperature of protective PTC device 20. Heater PTC device 24 also has a substantially greater initial resistance than protective PTC device 20. The resistance and switching temperatures of heater PTC device 24 are such that it switches to its high resistance state every time the circuit is energized. When heater PTC device 24 reaches its switching temperature, a trickle current continues to flow through same for maintaining same at its switching temperature. Heat is transferred from heater PTC device 24 to protective PTC device 20 as generally indicated by lines 26.

By way of example only and not by way of limitation, heater PTC device 24 may have an initial resistance of a few ohms, while protective PTC device 20 has an initial resistance of a few milliohms. Heater PTC device 24 may have a switching temperature of around 110° C., while protective PTC device 20 may have a switching temperature of around 125°-130° C. When the circuit is energized, the power dissipation within heater PTC device 20, in accordance with $V^2/R$, causes same to reach its switching temperature and its resistance jumps sharply. A trickle current then continues to flow through same for maintaining same in its high resistance state. Heat is transferred to protective PTC device 20 for heating same to an elevated temperature substantially above the ambient or environmental temperature conditions to which the protective PTC device would ordinarily be exposed. In the event of a malfunction, such as a motor stall or the like, protective PTC device 20 will rapidly reach its switching temperature and block effective current flow to the load. In the example given, only a 15°-20° rise in temperature of protective PTC device 20 is required before its switching temperature is reached. This substantially reduces the response time of the protective PTC device as compared to arrangements where the required temperature rise is from a much lower ambient temperature than from the elevated temperature provided by the heater PTC device. In addition, the response time of the protective PTC device is also substantially more uniform and independent of varying ambient temperature conditions.

Figure 2:
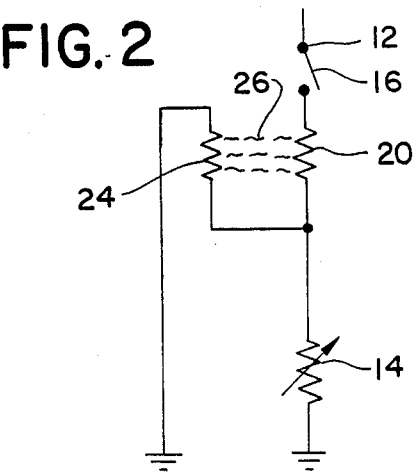
FIG. 2 shows another circuit arrangement.
Figure 3:
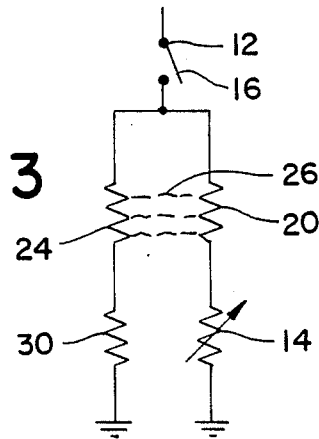
FIG. 3 shows another circuit arrangement.

FIG. 1 shows the heater and protective PTC devices connected in parallel. In the arrangement of FIG. 2, protective and heater PTC devices 20, 24 are connected in series, with heater PTC device 24 being connected in parallel with load 14. Thus, all of the circuit current flows through protective PTC device 20. In the arrangement of FIG. 3, a limiting resistance 30 is connected in series with heater PTC device 24 where the initial current through such PTC device must be held to a value below the self-limiting current of such PTC device.

Figure 4:
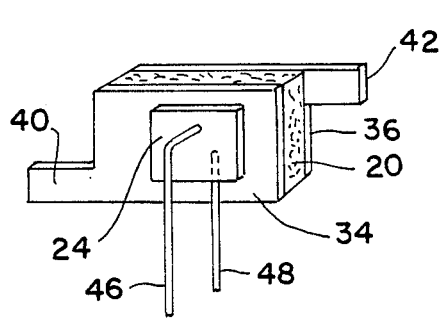
FIG. 4 is a perspective illustration showing a unitary assembly of a protective PTC device and a heater PTC device intended for connection in parallel.

FIG. 4 shows a unitary assembly of a protective PTC device and a heater PTC device. Brass plates 34, 36 are conductively bonded to opposite faces of protective PTC device 20, and include connector terminals 40, 42. Heater PTC device 24 is bonded to the outer surface of brass plate 34 with a dielectric adhesive, and a dielectric spacer is interposed between such PTC device and plate 34. Heater PTC device 24 has conductive metal foil or mesh bonded or embedded in its opposite flat faces, and connector leads 46, 48 are attached thereto. Terminals 40, 46 are adapted for connection to the voltage source, and terminal 42 is adapted for connection to the load. Thus, the unitary assembly of FIG. 4 may be connected as shown in FIG. 1. The intimate unitary assembly of the two PTC devices efficiently transfers heat from the heater PTC device to the protective PTC device.

Figure 5:
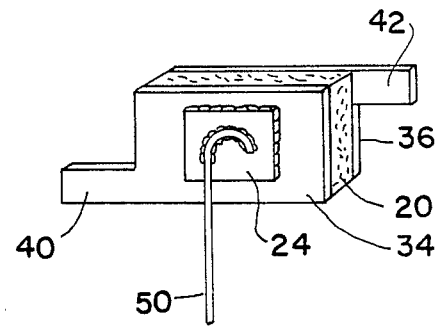
FIG. 5 is a perspective illustration showing a unitary assembly of a protective PTC device and a heater PTC device intended for connection in series.

FIG. 5 shows an arrangement wherein heater PTC device 24 has one of its faces conductively soldered to the outer surface of brass plate 34. A single connector lead 50 is attached to the opposite outer face of heater PTC device 24. In this arrangement, connector terminal 40 can be connected to the voltage source, while terminal 42 is connected with the load. Terminal 50 is then connected to ground for effectively connecting the two PTC devices in series, while the heater PTC device is in parallel with the load as in the circuit of FIG. 2.

In the arrangements shown and described, the two PTC devices are switchable to their high resistance state at a predetermined temperature range. The switching temperature range of the heater PTC device is substantially lower than the switching temperature range of the protective PTC device. The heater PTC device is switchable to its high resistance state during normal operation of the circuit and load, while the protective PTC device is switchable to its high resistance state only under abnormal operation of the circuit and load. The heater PTC device switches to its high resistance state during normal operation of the circuit for maintaining the protective PTC device at an elevated temperature that is still below the temperature range at which the protective PTC device switches to its high resistance state. With such an arrangement, the switching time of the protective PTC device is less susceptible to fluctuations in ambient temperatures.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A thermal protector for electric circuits comprising first and second PTC devices connectable in series and being in heat transfer relationship with one another, said first PTC device being connectable in parallel with a load protected by said second PTC device, and said first PTC device being switchable to a high resistance state at a substantially lower temperature than said second PTC device, whereby switching of said first PTC to its high resistance state transfers heat to said second PTC device for maintaining same at an elevated temperature substantially below its switching temperature but at which elevated temperature its switching time is less susceptible to variations in ambient temperature.

2. A thermal protector circuit for protecting a load comprising:

a protective PTC device connected in series with said load and being switchable to a high resistance state at a predetermined temperature range, a heater PTC device connected in series with said protective PTC device and in parallel with said load and being positioned in heat transfer relationship with said protective PTC device, said heater PTC device being switchable to a high resistance state at a substantially lower temperature range than said protective PTC device, said heater PTC device being switchable to its high resistance state during normal operation of said load, and said protective PTC device being switchable to its high resistance state only under abnormal operation of said load, said heater PTC device being switchable to its high resistance state during normal operation of said circuit for maintaining said protective PTC device at an elevated temperature that is still below the temperature range at which said protective PTC device switches to its high resistance state, whereby the switch time of said protective PTC device is less susceptible to fluctuations in ambient temperature.

3. A system for substantially reducing the switch time of a protective PTC device and also making such switch time more uniform under varying ambient temperature conditions comprising:
- a protective PTC device for protecting a load and being switchable to a high resistance state at a predetermined temperature range,
- a heater PTC device positioned in heat transfer relationship with said protective PTC device and being switchable to a high resistance state at a temperature range substantially lower than said predetermined temperature range of said protective PTC device,
- said heater PTC device having an initial resistance that is substantially greater than the initial resistance of said protective PTC device, and
- said heater PTC device being switchable to its high resistance state under normal operating conditions of said protective PTC device for maintaining said protective PTC device at an elevated temperature greater than ambient temperature and less than said predetermined temperature range at which said protective PTC device switches to its high resistance state, whereby the time required for said protective PTC device to reach its switchable temperature is substantially reduced and is more uniform under varying ambient temperature conditions.

* * * * *